(12) United States Patent
Spahr et al.

(10) Patent No.: US 7,087,128 B2
(45) Date of Patent: Aug. 8, 2006

(54) METHOD FOR MANUFACTURING BICYCLE COMPONENTS

(75) Inventors: Stefan Spahr, Lengnau (CH); Rudolf Kurth, Büren (CH)

(73) Assignee: DT Swiss Inc., Grand Junction, CO (US)

( * ) Notice: Subject to any disclaimer, the term of this patent is extended or adjusted under 35 U.S.C. 154(b) by 375 days.

(21) Appl. No.: 10/681,546

(22) Filed: Oct. 8, 2003

(65) Prior Publication Data

US 2005/0076489 A1    Apr. 14, 2005

(51) Int. Cl.
*B32B 37/00* (2006.01)
*B65H 81/00* (2006.01)

(52) U.S. Cl. ............... 156/156; 156/172; 156/173; 156/175; 156/187; 156/188; 156/194

(58) Field of Classification Search ........... 156/156, 156/172, 173, 175, 187, 188, 194
See application file for complete search history.

(56) References Cited

U.S. PATENT DOCUMENTS 4,348,247 A * 9/1982 Loyd et al. ............... 156/156
4,889,355 A * 12/1989 Trimble ................... 280/281.1
5,364,095 A * 11/1994 Easton et al. ............. 473/566
2002/0108248 A1* 8/2002 Meggiolan ............... 29/894.36
2002/0109398 A1* 8/2002 Meggiolan ............... 301/110.5

FOREIGN PATENT DOCUMENTS

| EP | 1 231 047 A1 | | 8/2002 |
| JP | 57-98320 A | * | 6/1982 |
| JP | 61-220828 A | * | 10/1986 |
| WO | WO-94/16911 A1 | * | 8/1994 |

* cited by examiner

*Primary Examiner*—Jeff H. Aftergut
(74) *Attorney, Agent, or Firm*—Greer, Burns & Crain Ltd.

(57) ABSTRACT

A method for manufacturing a hub in particular for bicycles and the like, wherein a winding device comprising at least a first shaping device is provided, a predetermined quantity of fibers is deposited on said first shaping device, at least a first cross-linking agent is deposited on at least part of the fibers, said first shaping device is inserted into a second shaping device and said first shaping device with at least said fibers and at least said first cross-linking agent is expanded toward said second shaping device, wherein said shaping devices are matched relative to each other such that an expanded body comprising said fibers and said cross-linking agent has a substantially even thickness.

19 Claims, 5 Drawing Sheets

25 a   25 b   25 c

METHOD FOR MANUFACTURING BICYCLE COMPONENTS

The present invention relates to a method for manufacturing components, in particular for bicycles and the like. The invention is described with reference to bicycle hubs; however, reference is made to the fact that the method can also be used for other bicycle components such as frame elements, tubes and the like.

Such hubs have been known from the prior art for a long time. In the manufacture of bicycles, in particular in the field of highly competitive sports but also in popular sports, ever-increasing importance is attributed to reducing the weight of the bicycles or of the individual components. Therefore, specifically for bicycles, hubs made from carbon are known from the prior art.

With the manufacturing methods for bicycle hubs as known from the prior art, the process products, i.e. the manufactured bicycle hubs, exhibit a comparatively unsmooth outer surface which is why finishing processes are required which results in increased manufacturing costs. This means that although the hubs according to the prior art already exhibit satisfactory properties, the quality in particular of the surface finish can be further enhanced.

The object of the present invention is therefore to decrease the manufacturing costs for bicycle hubs. Apart from this, the method of the invention is intended to enhance the quality in particular of the surface finish. In the present invention, this object is achieved by a method for manufacturing hubs, in particular for bicycles and the like, wherein a first shaping device is provided in a first process step. A predetermined quantity of fibers is applied on said first shaping device, and at least a first cross-linking agent is applied to at least part of the fibers. Said first shaping device is further inserted into a second shaping device. In a further process step, said first shaping device with at least the fibers and at least said first cross-linking agent is expanded toward said second shaping device, said shaping devices being matched to each other such that an expanded body comprising said fibers and said cross-linking agent exhibits a substantially uniform thickness.

Depositing the fibers is preferably understood to mean that the fibers are positioned on the first shaping device. One option is to wind the fibers or the fiber fabric, respectively, around the first shaping device. The fibers are preferably wound in the peripheral direction along the length of said first shaping device. However, depositing may also be understood to mean that individual layers are positioned on said first shaping device, preferably at least partly one upon another, wherein the cross-linking agent may be arranged between the individual layers.

The fibers may also be deposited simultaneously with the cross-linking agent. In this case, the fibers are provided with the cross-linking agent added to them before depositing them on the first shaping device. Depositing the fibers and applying the cross-linking agent can therefore be effected concurrently. In a preferred variant, the fibers consist of a carbon fiber fabric with a cross-linking agent matrix.

The fibers may be deposited on the shaping device both in longitudinal and in peripheral direction. Individual fibers may also be deposited in longitudinal direction, other fibers in peripheral direction.

The fibers may be provided with cuts before being deposited on the first shaping device in order to be fitted to the shaping device sections which vary in longitudinal direction. The fibers may also be cut to size prior to being deposited on the first shaping device.

Expanding is understood to mean that at least in the process step concerned, the volume of the first shaping device is at least slightly increased. It is preferred that the first shaping device regains its original volume in this process step, i.e. the volume it had before the fibers were deposited. This means that, caused by or during depositing the fibers, the volume of the first shaping device is preferably reduced, in particular at least slightly compressed. It is also conceivable, however, that by expanding, the first shaping device ultimately obtains a volume larger than its original volume.

On the other hand, it is also conceivable that during deposit of the fibers, the first shaping device is compressed more than it was expanded in the process step described above. In such a case, the size or the volume, respectively, which the first shaping device obtains after expansion, is smaller than the original size prior to depositing the fibers.

It is further possible that during deposit of the fibers, compression of the first shaping device is uneven so that after expansion, the cross-sections of some portions are larger than those of the original body i.e. than the first shaping device prior to depositing the fibers, and the cross-sections of other portions are smaller.

The term expanded body therefore relates to a body which was expanded in the process step mentioned above. In this conjunction it is therefore irrelevant whether the first shaping device around which the fibers are wound is compressed when the fibers are deposited.

The advantage of such reciprocal matching lies in that when the first shaping device is inserted into the second shaping device, the distance between the two shaping devices is substantially even over the entire surface such that in this way the pressure applied to the fibers and the cross-linking agent arranged between the shaping devices is substantially even over the entire surface when the first shaping device is expanded toward the second shaping device. This results in that the end product exhibits a substantially uniform thickness over the entire surface and also a comparatively uniform surface such that a further finishing process for the surface is not necessary.

A shaping device is understood to mean a device which acts upon the material to be processed, in particular but not exclusively by its geometrical shape, such that during the procedure, the material receives a specific shape determined by the shaping device. A shaping device is intended to act upon the material both with its outer surface and its inner surface, or with both surfaces.

Inserting the first shaping device into a second shaping device is understood to mean that in its inserted state, the first shaping device is at least partially surrounded by the second shaping device. It is preferred that substantially the entire volume of the first shaping device is received in the second shaping device. The material to be processed will then be spatially positioned substantially between the outer periphery of the first shaping device and the inner periphery of the second shaping device.

Matching the shaping devices is understood to mean that the surfaces involved in shaping the material, in this case the outer surface of the first shaping device and the inner surface of the second shaping device, exhibit surfaces having a predetermined relationship to one another. It is preferred that the outer surface of the first shaping device has substantially the same shape as the inner surface of the second shaping device wherein the surface of the first shaping device is smaller than the inner surface of the second shaping device. In other words, the volume enclosed in or surrounded by the inner surface of the second shaping device is larger than the volume enclosed in or surrounded by the outer surface of the first shaping device. It is preferred that in the assembled state, the distance between the first shaping device and the second shaping device is substantially uniform over the entire surface.

One example for such matching of two shaping devices are two hollow cylinders, one placed inside the other, with one cylinder having a larger diameter than the other.

In a further process step, the first shaping device is removed from the expanded body. For this purpose, at least part of the first shaping device consists of a flexible material. It is preferred that the first shaping device is made of silicone or contains silicone.

It is preferred that the flexible material is designed such that the first shaping device is at least partially deformable at least in a radial direction. Such deformability is intended to allow the first shaping device to be removed from the expanded body. The first shaping device is preferably deformable in a radial direction at least to the extent that the portions having the largest cross-sections can be moved through the portions having the smallest cross-sections inside the expanded body.

The expanded body substantially consists of the fibers to which the cross-linking agent has been applied or of the cross-linked material resulting from the process, respectively.

Another method of the invention consists in that a third shaping device on which fibers have been deposited is inserted into a body blank and the fibers deposited on the third shaping device are bonded with the expanded body. In this method, a variation of at least one thermodynamic state variable, preferably elevation of the temperature, effects or influences a cross-linking of the fibers and thus a bonding of the fibers with the expanded body. More precisely, elevation of the temperature causes the fibers to cross-link with the cross-linking agent.

The body blank is preferably the expanded body manufactured with the method described above. It is thus preferred for the method of the invention that the fibers are cross-linked in two individual process steps which are preferably performed at separate times. As mentioned above, one of the steps preferably serves to manufacture a body blank or expanded body, respectively, which already has the shape of the end product, i.e. the finished hub, at its outer surface, and which does not require additional finishing processes.

The body blank is subsequently further processed at its inner peripheral surface by depositing more material.

It is preferred that in a further process step, the expanded body is clamped to the third shaping device prior to heating in order to secure the components during the further processing, in particular during heating.

Such clamping is preferably intended to stabilize the individual components relative to each other wherein in particular the shaping elements of the third shaping device are clamped to each other in the longitudinal direction of the expanded body. Apart from that, the clamping is intended to secure the individual components relative to each other for a further finishing process, if required.

The third shaping device preferably exhibits an outer contour which substantially corresponds to the inner contour of the hub to be manufactured.

A further preferred step is that prior to depositing the fibers, the first shaping device is pushed onto a core which preferably contains metal. This results in that the shape of the first shaping device can be maintained stable during deposit of the fiber material or the individual carbon layers, respectively. When the fibers have been deposited on or wound around the first shaping device, the core is removed from the first shaping device. This results in that the first shaping device can now be expanded toward the second shaping device. Such expansion is preferably effected by increasing the pressure inside the first shaping device. It is preferred that the first shaping device is inserted into the second shaping device such that a substantially airtight closure is achieved. The fiber is preferably a carbon fiber. However, other materials may also be used, in particular but not limited to glass, aramide, polyester, Diolen or the like.

It is preferred that the fibers are joined to form a preferably long stretched-out fiber fabric which is wound around the first shaping device. The preferred procedure is to first wind the carbon fiber, then the fiber fabric, and thereafter another layer of carbon fiber.

It is preferred that fibers of the type specified above are wound also around the third shaping device.

The cross-linking agent is preferably selected from a group of cross-linking agents consisting of resins, including but not limited to epoxy resins, polyurethane, polyester, vinylester and the like. The second shaping device further comprises preferably at least two shaping elements whose inner contours are substantially symmetrical relative to each other. It is in particular preferred that the shape of the inner contour is rotationally symmetrical.

The invention is further related to a hub in particular for bicycles and the like comprising a substantially rotationally symmetrical outer body having a substantially uniform thickness. The outer body is understood to mean the intermediate product from the process described above, i.e. the expanded body or the body blank, respectively.

It is preferred that at its end portions the hub comprises apertures spaced substantially evenly apart from each other in the peripheral direction.

Further advantages and embodiments of the method of the invention can be taken from the accompanying drawings.

Figure 1:
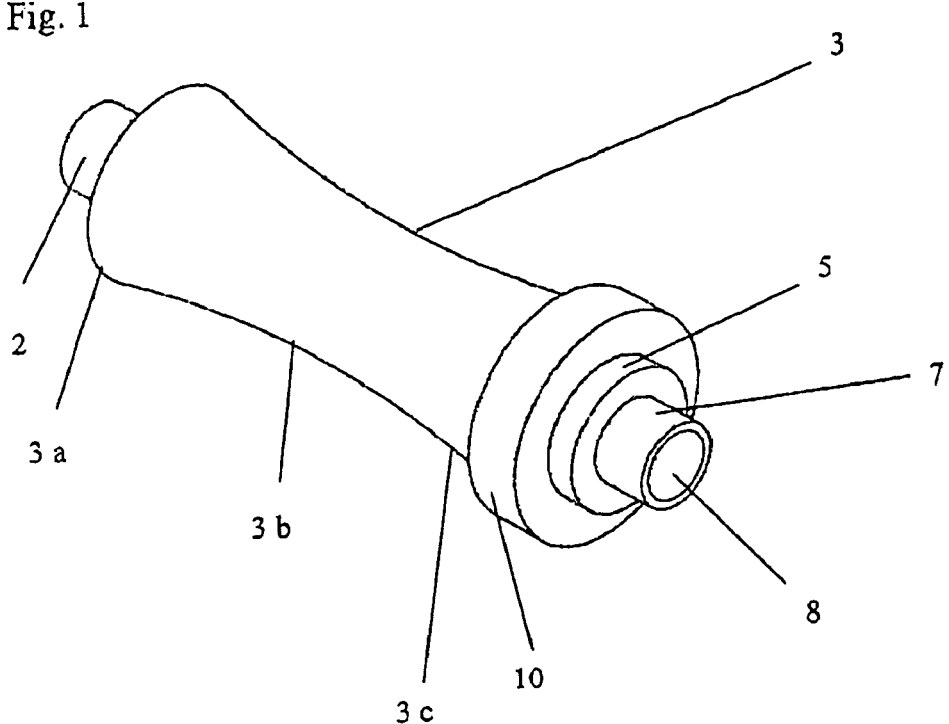
FIG. 1 depicts the first shaping device to be used for the method of the invention with the stabilizing device to be used optionally.

FIG. 1 shows the first shaping device 3 in a general view. Reference numeral 2 relates to a substantially cylindrical body attached to one of the two ends, to be used preferably as a handle, thus facilitating handling of the shaping device during deposit of the fibers according to the invention. The cylindrical body 2 preferably comprises an internal thread to allow a screw connection with the stabilizing device. Reference numerals 3a and 3c relate to end portions with substantially circular cross-sections with diameters of between 0.5 cm and 10 cm, preferably between 2 cm and 5 cm and in particular preferably between 3 cm and 4 cm. Reference numeral 3b shows the center portion having a diminishing diameter. The center portion has a minimum external diameter of 0.5 cm to 10 cm, preferably between 2 and 3 cm and in particular preferably between 2.3 cm and 2.8 cm. It follows from this that the narrowest portion of the center portion has a preferred diameter of 65 to 75 percent of the diameter of the end portions.

The first shaping device has a substantially rotationally symmetrical shape. The first shaping device comprises a hollow space—not shown—in longitudinal direction to receive the stabilizing device 7, Reference numeral 7 shows the preferably cylindrically shaped stabilizing devices. which is preferably made of metal, positioned inside. Reference numeral 10 relates to an annular enlargement of the stabilizing device which provides additional stabilization in particular during deposit of the fibers, and a seal.

Reference numeral 5 relates to the screw connection of the stabilizing device positioned inside, which has a hexagonal design in a preferred embodiment such that it can be tightened or loosened with an appropriate tool.

Figure 2:
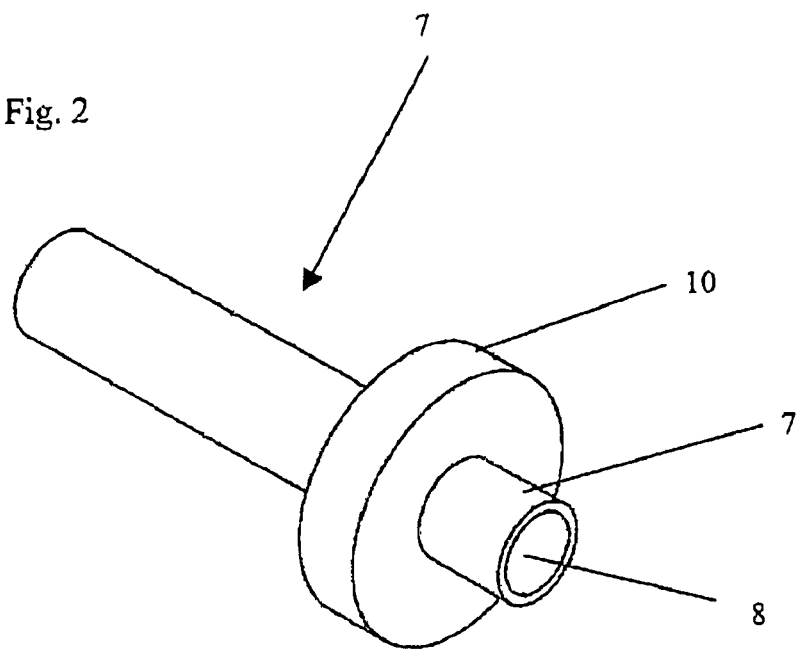
FIG. 2 is a detailed view of said stabilizing device.

FIG. 2 shows the stabilizing device 7. The stabilizing device is preferably longer than the first shaping device 3 and it is inserted in such a way that at least one of the two end portions of the stabilizing device protrudes in longitudinal direction from the end portions of the first shaping device. It is preferred that the portion protruding from the longitudinal direction of the first shaping device 3, together with the cylindrical body 2, serves to facilitate depositing or winding, respectively, of the fiber material. It is also possible to use preferably motorized winding devices (not shown).

In this embodiment, the stabilizing device has a substantially cylindrical cross-section and is preferably hollow inside. Inserting the stabilizing device serves to stabilize the first shaping device so as to facilitate a deposit of the pre-cut carbon fiber fabric and the epoxy resin matrix serving as a cross-linking agent. The hollow space designated by reference numeral 8 in the stabilizing device serves to reduce the weight; in conjunction with a correspondingly permeable outer wall it may also be used to supply gas for the purpose of increasing the pressure. Unless the stabilizing device is used to build up pressure, it is removed from the first shaping device once the fiber material is deposited.

Figure 3:
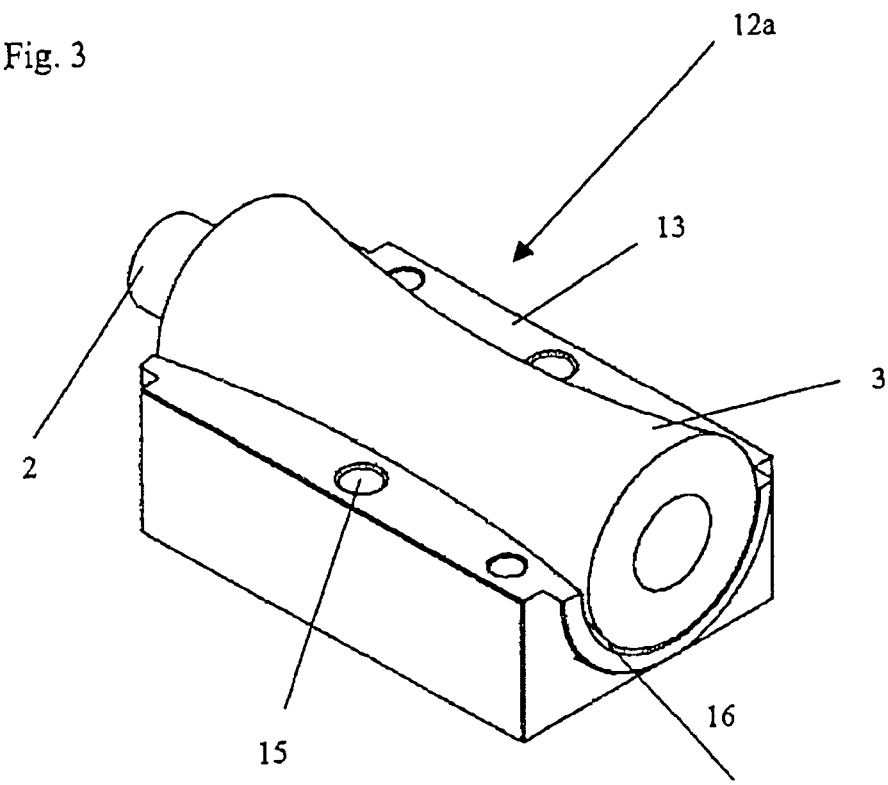
FIG. 3 depicts a shaping element of the second shaping device with said first shaping device inserted.

FIG. 3 shows a top view of the shaping element 12a of the second shaping device 13 with the first shaping device inserted into it. The fibers and the cross-linking agent are already deposited on the first shaping device. Reference numeral 15 shows a receiving hole for the screw connection; the receiving holes are preferably arranged diagonally opposed to one another to achieve an even distribution of the pressure. Reference numeral 16 relates to the distance between the first 3 and the second 13 shaping device, which is substantially uniform over the entire mold and thus allows to obtain the smooth surface desired.

Figure 4:
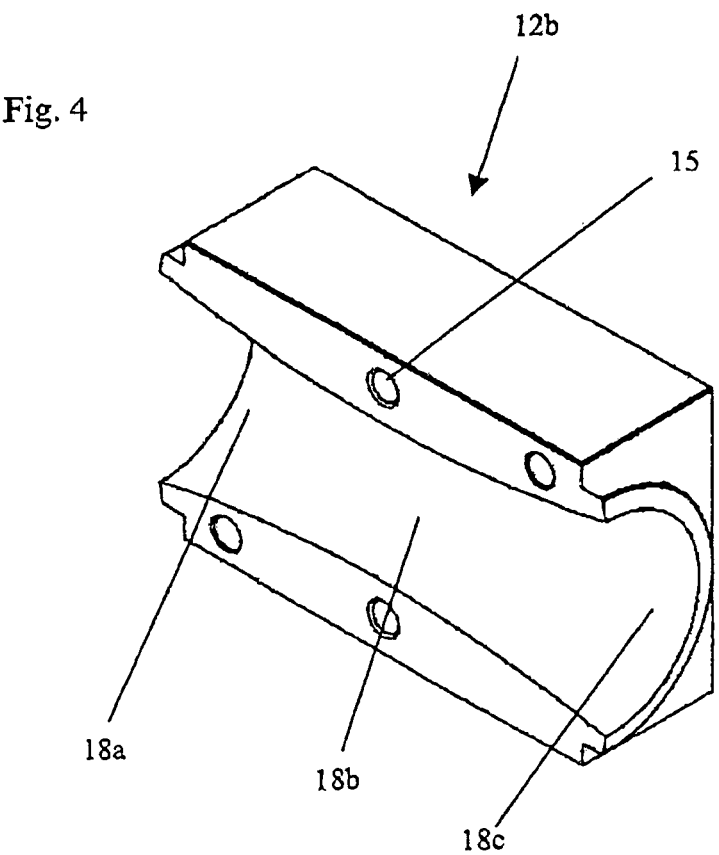
FIG. 4 is a further shaping element of said second shaping device.

FIG. 4 shows another shaping element 12b of the second shaping device in a perspective view. The reference numerals 18a and 18c relate to the outer end portions of the shaping hollow space, reference numeral 18b relates to the diminishing or the diminished center portion. The shape of the first shaping element 12a is substantially mirrored here wherein the distance designated with the numeral 16 and being even over the entire mold lies between 0.1 and 5 mm. A preferred embodiment exhibits a distance of between 0.2 and 1 mm, a particularly preferred embodiment a distance of between 0.3 and 0.9 mm.

As can be seen in FIG. 4, the end portions 18a and 18c protrude from the substantially square-shaped base body 13 of the second shaping device. Said protruding portions serve as a substantially airtight seal during expansion of the first shaping device 3.

Figure 5:
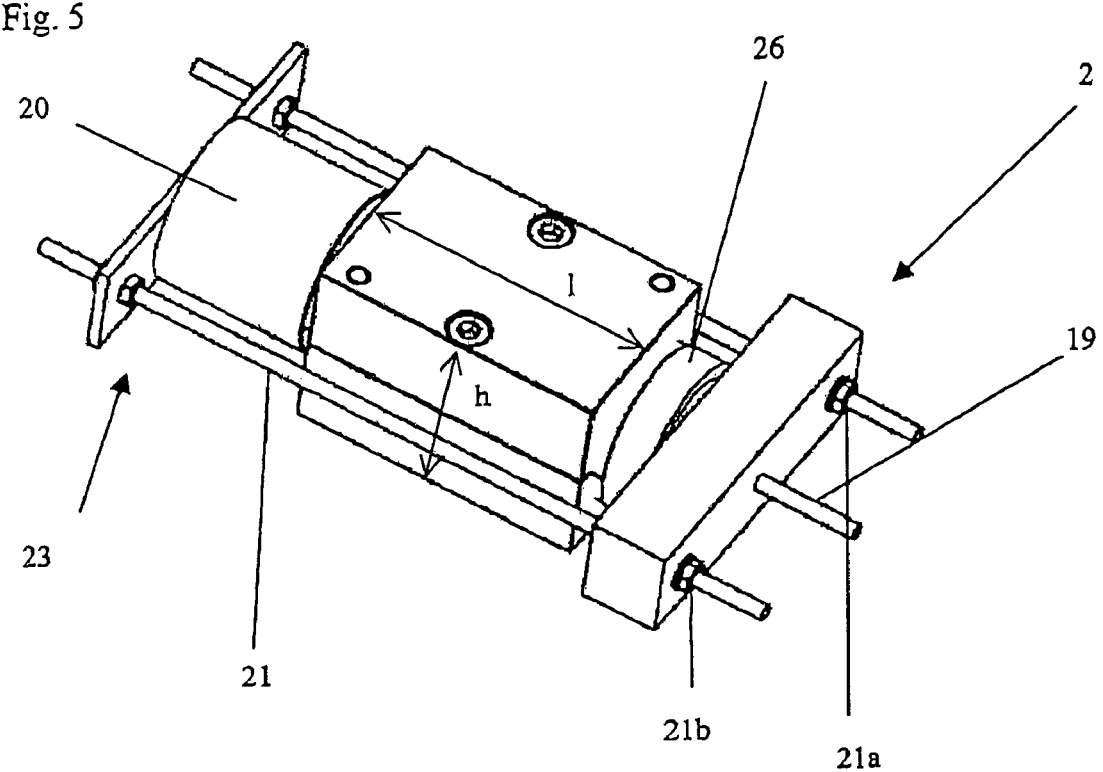
FIG. 5 depicts the closed, screwed second shaping device.

FIG. 5 shows the closed second shaping device. It is preferred that the device is closed in the horizontal direction h by using Allen screws. A closure in vertical longitudinal direction 1 is achieved by an externally arranged framing device 23 comprising two metal rods 21, whose total length extends the outer dimensions of the second shaping device; in a preferred embodiment, the rods are provided with a screw thread at least at one end, preferably at both ends.

Reference numeral 20 relates to a substantially cylindrical body attached to one end of the second shaping device. Said body 20 preferably serves to seal the system against the ambience. For this purpose, the body 20 is pushed onto the end portions 18a protruding from the square-shaped base body 13. In order to enhance the sealing properties, a sealing means (not shown) may be provided between the end portion 18a and the cylindrical body, in particular but not limited to an O-ring, for which it is in particular preferred that it is arranged in an internal groove provided inside the body 20.

It is further preferred that the body exhibits a cross-section which is enlarged toward the right-hand end shown in FIG. 5, which results in a substantially tight connection when the body 20 is pressed onto the second shaping device 3 or to the end portions 18a and 18c respectively. In order to enhance the sealing properties it is further possible to apply grease or the like to the outer faces of the end portions 18a and 18c and/or to the inner faces of the body 20.

It is preferred that the body 20 is sealed airtight toward the end shown at the left in FIG. 5. For this purpose, a partition (not shown) may be provided inside the body, substantially to prevent air from flowing through the body 20. It is preferred that such partition is provided next to the section 18a of the second shaping device.

Reference numeral 26 shows another cylindrical body arranged at the other end of the second shaping device, including the supply device designated with 19, which allows the internal pressure of the shaping device to be increased to a pressure between 0.5 and 10 bar, preferred to a pressure between 2 and 8 bar, in particular preferred to a pressure between 5 and 7 bar.

The second cylindrical body 26 can be connected with the second shaping device in a manner similar to that used for the first cylindrical body 20. Also in this instance it is preferred that a sealing means such as a sealing ring is provided to achieve sealing against the ambience. It is further conceivable that the second cylindrical body is pushed onto the end portion 18a, or grease and the like may be applied to enhance the sealing effect. It is preferred that, apart from an aperture as a passage for the supply device 19 of FIG. 5, the second cylindrical body is sealed at the right-hand end.

Reference numeral 28 relates to a pressure supply device which, in interaction with the two securing devices 21a and 21b designed preferably as screw nuts, allows an even increase of the contact pressure of the second cylindrical body 26 against the second shaping device 3.

For the purpose of bonding the body blank or the expanded body, respectively, with the carbon fibers and the cross-linking agent, the entire device is heated to 50° C. to 200° C., preferred to 90° C. to 150° C., in particular preferred to 110° C. to 130° C. It is preferred to use a furnace for this heating. The elevated temperature is maintained for 30 to 90 minutes, preferred for 50 to 70 minutes. Electric heating devices such as heating wires, PTC elements or the like may be provided alternatively.

Figure 6:
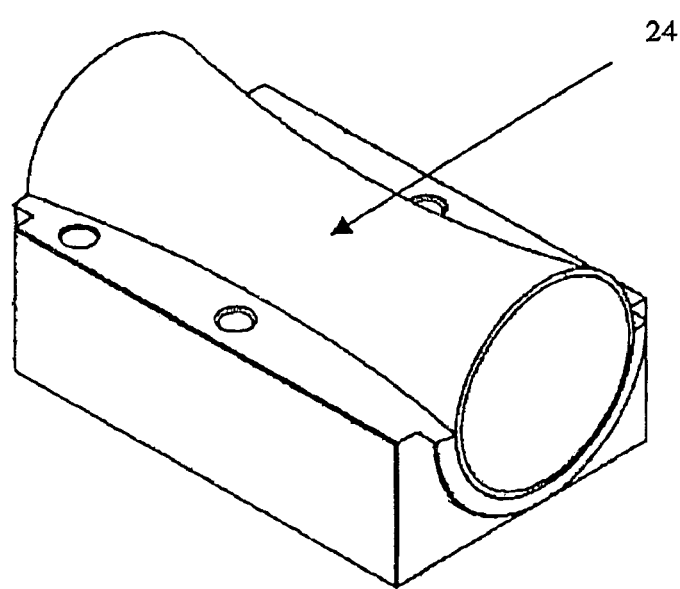
FIG. 6 depicts the expanded body obtained with the manufacturing method of the invention.

FIG. 6 shows a shaping element of the second shaping device where the expanded body manufactured with the described method of the invention is inserted, the first shaping device has already been removed in this illustration. The expanded body has an outer surface substantially corresponding to the inner surface 18 of the second shaping device, and an inner surface substantially corresponding to the outer surface of the first shaping device. By using the method of the invention, the expanded body obtains a surface finish which is smooth enough so that further finishing processes can be omitted. The expanded body is between 3 cm and 15 cm in length, preferred between 6 cm and 11 cm and in particular preferred between 8 cm and 9 cm.

Figure 7:
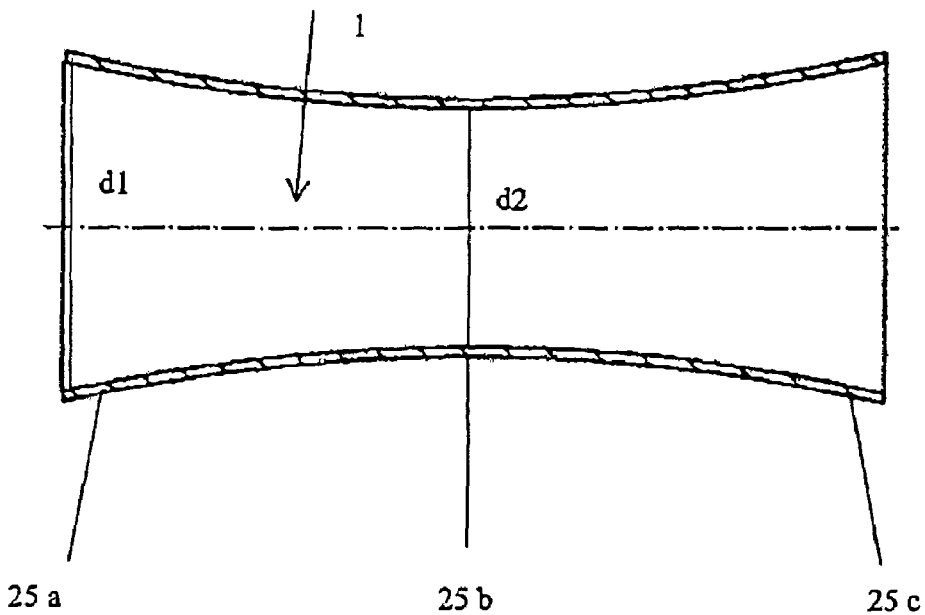
FIG. 7 is a cross-sectional view of the body.

FIG. 7 is a cross-sectional illustration of the expanded body or the body blank, respectively, of the invention. Reference numerals 25a and 25c relate to the end portions having substantially circular cross-sections with a diameter d1 of between 0.5 cm and 10 cm, preferred between 2 cm and 5 cm and in particular preferred between 3 cm and 4 cm. Reference numeral 25b relates to the diminishing center portion. The center portion has a minimum inner diameter d2 of 0.5 cm to 10 cm, preferred between 1 and 5 cm and in particular preferred between 2 cm and 3 cm. l designates the rotational axis relative to which the body is substantially rotationally symmetrical. The resulting thickness of the expanded body is between 0.1 and 5 mm, preferred between 0.3 and 1.5 mm and in particular preferred between 0.3 and 0.9 mm.

It is preferred that the cross-section of the expanded body exhibits external and internal peripheries having a constant radius of curvature. Instead of the specified dimensions, other dimensions may be used, ultimately depending on the component to be manufactured. The dimensions chosen will for example be considerably larger for hubs intended to receive components such as a braking device or a gear-shifting device.

Figure 8:
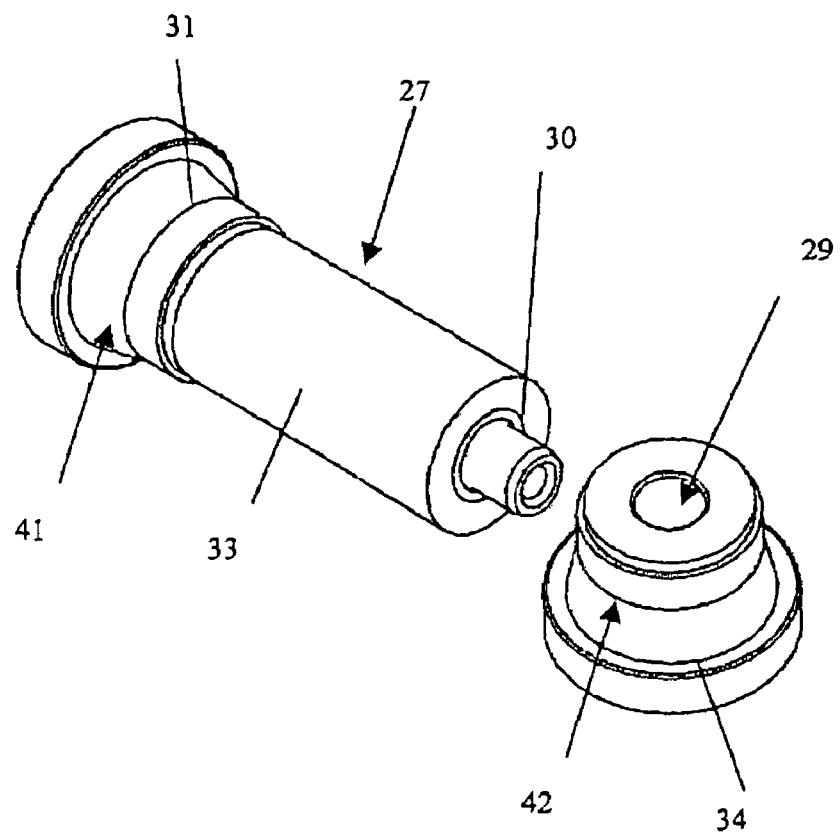
FIG. 8 depicts the opened third shaping device.

FIG. 8 shows two partial elements of the third shaping device of the invention. Reference numeral 33 relates to the stabilizing center portion which is preferably provided with a protruding screw thread 30 at one end. Such thread serves to form a screw connection of the two elements of the third shaping device 27, reference numeral 29 relates to the hollow space of the second partial element of the third shaping device 27 in which an internal thread is provided. Reference numeral 34 relates to that part of the device which substantially serves as the shaping element, reference numeral 31 relates to the protrusion intended to form bearing carriers. The protrusions can be adapted to correspond to the specific requirements.

The fiber material is wound around the external zones 41, 42, preferably but not limited to a structure of three layers consisting of one layer of unidirectional carbon fibers, one layer of carbon fiber fabric and another layer of unidirectional carbon fibers. In order to manufacture a body according to the invention, the components of the third shaping device may be clamped to each other.

Figure 9:
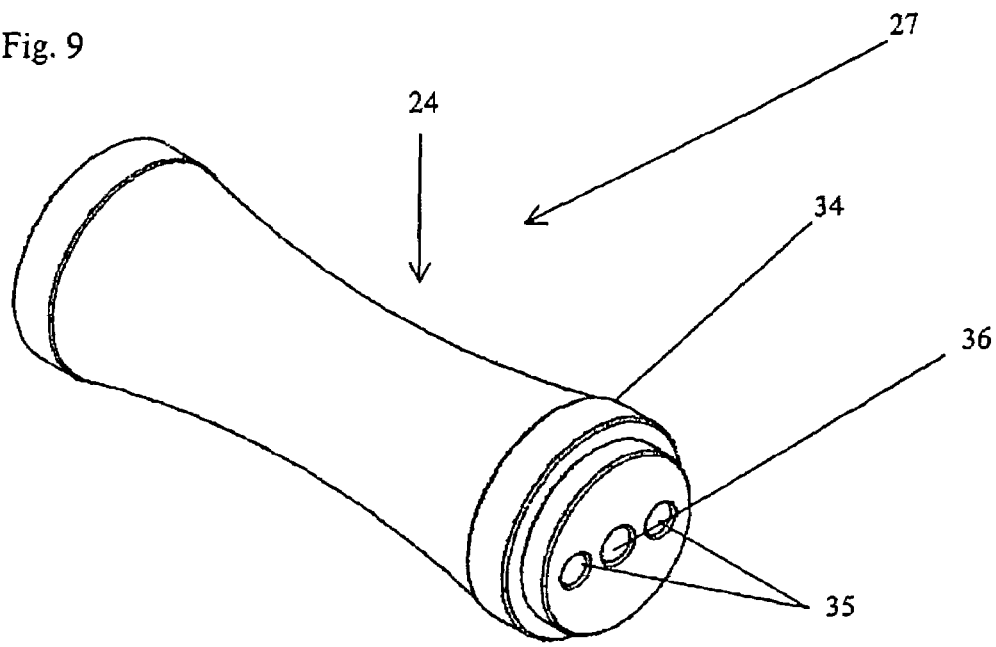
FIG. 9 depicts the closed third shaping device with expanded body.

FIG. 9 shows the assembled third shaping device with the expanded body attached to it. To facilitate attaching, the parts in particular the expanded body may be pre-heated by means of a hair dryer. It is preferred that in this step the inner surface of the expanded body is fitted closely to the third shaping device, preferably at least at the end portions thereof.

Reference numeral 34 relates to that part of the device which serves as the shaping element. The shaping device 34 is preferably provided with two receiving holes 35 so it can be tightened and loosened by means of an appropriate tool. Reference numeral 36 relates to the hollow space which serves to reduce the weight and which is arranged in the center.

For the purpose of bonding the body blank or the expanded body, respectively, with the newly deposited carbon fibers, the entire device is heated to 50° C. to 200° C., preferred to 90° C. to 150° C., in particular preferred to 110° C. to 130° C. It is preferred to use a furnace for this heating. The elevated temperature is maintained for 30 to 90 minutes, preferred for 50 to 70 minutes. Electric heating devices such as heating wires, PTC elements or the like may be provided alternatively.

Figure 10:
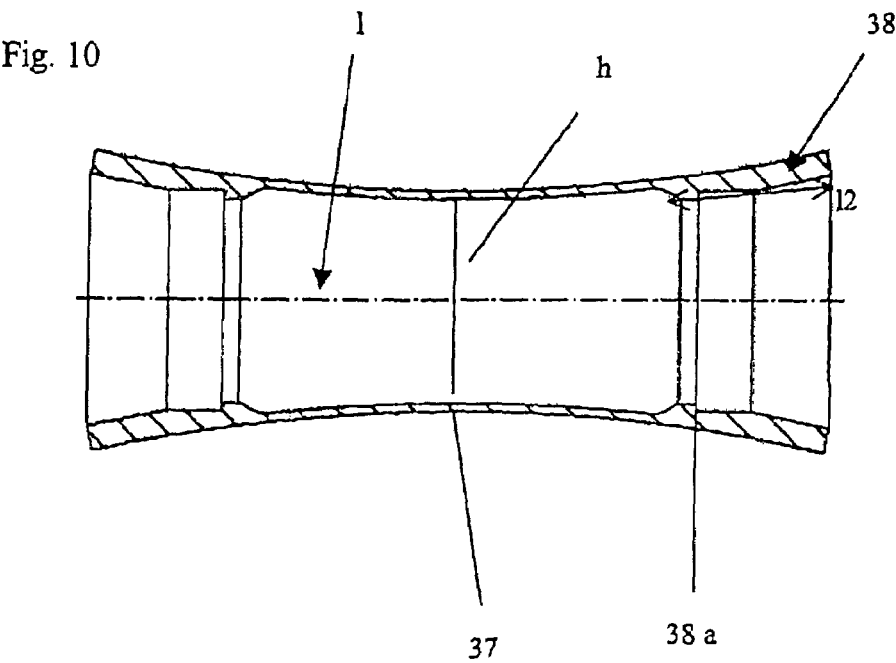
FIG. 10 depicts a cross-sectional view of the expanded body after further processing by means of said third shaping device device.

FIG. 10 is a cross-sectional illustration of the body manufactured according to the invention or the hub, respectively. l designates the rotational axis relative to which the body is substantially rotationally symmetrical. h designates the axis relative to which the body is substantially symmetrical. L2 designates the right-hand portion subsequently processed by means of the third shaping device shown in FIG. 8; the outer surface of the body is substantially unchanged compared to the first processing step.

Reference numeral 38a designates the actual bearing carrier. The design can be freely adapted to the individual purposes i.e. constructed for different types of hub. As can be seen in FIG. 10, the inner periphery of the bearing carrier 38a runs substantially parallel to the axis of rotation l. The inner periphery of the end portion runs at a predetermined angle toward the axis of rotation l. This angle is between 0° and 90°, preferred between 0° and 40° and in particular preferred between 0° and 10°. The center portion of the hub remains substantially unchanged in the subsequent processing.

The end portions 41 of the completed hub have a thickness of between 0.5 mm and 5 mm, preferred between 1 mm and 4 mm and in particular preferred between 2.3 mm and 3 mm. The internal diameter of the end portions is between 1 cm and 5 cm, preferred between 2 cm and 4 cm and in particular preferred between 2.5 cm and 3.5 cm.

The invention claimed is:

1. A method for manufacturing a hub, in particular for bicycles and the like, comprising the following steps:
   providing a winding device comprising at least a first shaping device;
   applying a predetermined quantity of fibers on said first shaping device;
   applying at least a first cross-linking agent to at least part of the fibers;
   inserting said first shaping device into a second shaping device;
   spatially-expanding of said first shaping device including at least said fibers and at least said first cross-linking agent toward said second shaping device, wherein said shaping devices are matched to one another such that an expanded body comprising the fibers and the cross linking agent exhibits a substantially uniform thickness; and
   removing the expanded body from said second shaping device;
   using said expanded body as a body blank;
   providing a third shaping device;
   depositing a predetermined quantity of fibers on said third shaping device;

applying at least a second cross-linking agent to at least part of said second fibers; and inserting said third shaping device into said body blank and bonding at least said second fibers and said cross-linking agent with said body blank.

2. The method of claim 1, characterized in that the distance between said first shaping device and said second shaping device is substantially constant prior to expansion of said first shaping device.

3. The method of claim 1, characterized in that in a further process step said first shaping device is removed from the expanded body.

4. The method of claim 1, characterized in that prior to depositing the fibers, said first shaping device is pushed on to a core that preferably contains metal.

5. The method of claim 4, characterized in that after depositing the fibers, said core containing a metal is removed from said first shaping device.

6. The method of claim 1, characterized in that said first shaping device at least partially consists of a flexible material.

7. The method of claim 1, characterized in that expansion of said first shaping device is effected by varying at least one thermodynamic state variable, preferably the temperature or the pressure.

8. The method of claim 1, characterized in that said second shaping device comprises at least two shaping elements with internal contours that are substantially symmetrical relative to each other.

9. The method of claim 1, characterized in that elevation of the temperature causes the fibers to cross-link with the cross-linking agent.

10. The method of claim 1, characterized in that the fiber comprises a material selected from a group of materials including carbon, glass, aramide, polyester and the like.

11. The method of claim 1, characterized in that the fiber is joined to form a fiber fabric which is wound around said first shaping device.

12. The method of claim 1, characterized in that the cross-linking agent is selected from a group of cross-linking agents including resins such as epoxy resins, polyurethane, polyester, vinylester and the like.

13. The method of claim 1, characterized in that elevation of the temperature causes the fibers to cross-link with the cross-linking agent.

14. The method of claim 1, characterized in that in a further process step, the expanded body and said third shaping device with said second fibers are clamped to each other.

15. The method of claim 1, characterized in that said third shaping device has an outer contour that substantially corresponds to the inner contour of the hub to be manufactured.

16. The method of claim 1, characterized in that the fiber comprises a material selected from a group of materials including carbon, glass, aramide, polyester and the like.

17. The method of claim 1, characterized in that the fibers are joined to form a fiber fabric which is wound around said third shaping device.

18. The method of claim 1, characterized in that said cross-linking agent is selected from a group of cross-linking agents including resins such as epoxy resins, polyurethane, polyester, vinylester and the like.

19. The hub of claim 15, characterized in that said method has openings formed at its end portions that are substantially equally spaced apart from each other in the peripheral direction.

* * * * *